(12) United States Patent
Zimmermann et al.

(10) Patent No.: US 6,668,634 B1
(45) Date of Patent: Dec. 30, 2003

(54) METHOD AND DEVICE FOR ESTIMATING AN ADMISSION PRESSURE IN A MOTOR VEHICLE BRAKE SYSTEM

(75) Inventors: Christian Zimmermann, Stuttgart (DE); Yoichi Arima, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/675,342

(22) Filed: Sep. 28, 2000

(30) Foreign Application Priority Data

Sep. 29, 1999 (DE) .......................................... 199 46 777

(51) Int. Cl.$^7$ .............................................. G01M 17/00
(52) U.S. Cl. .............................................. 73/129; 303/3
(58) Field of Search .......................... 73/121, 128, 129, 73/40, 46, 47, 49.7; 303/3, 11

(56) References Cited

U.S. PATENT DOCUMENTS

| | | | |
|---|---|---|---|
| 4,848,847 A | * | 7/1989 | Reinartz et al. |
| 5,021,957 A | * | 6/1991 | Yoshino et al. |
| 5,791,745 A | * | 8/1998 | Sakakibara |
| 5,927,832 A | * | 7/1999 | Fulks et al. |
| 5,954,406 A | * | 9/1999 | Sawada |
| 5,965,807 A | * | 10/1999 | Yamashita et al. |
| 6,123,395 A | * | 9/2000 | Wolf et al. .................... 303/11 |
| 6,132,010 A | * | 10/2000 | Holt et al. |
| 6,446,490 B1 | * | 9/2002 | Lohner et al. ................. 73/39 |

FOREIGN PATENT DOCUMENTS

| | | |
|---|---|---|
| DE | 195 28 697 | 2/1997 |
| DE | 197 29 097 | 1/1999 |

* cited by examiner

*Primary Examiner*—Eric S. McCall
(74) *Attorney, Agent, or Firm*—Kenyon & Kenyon

(57) ABSTRACT

A method for estimating an admission pressure prevailing between a main brake cylinder and an intake valve of a wheel brake cylinder of a motor vehicle brake system, with the admission pressure being estimated, taking into account a run-on voltage of a clocked-mode motor of a pump for recirculating brake fluid from an accumulator, located at the output end of the wheel brake cylinder, to the main brake cylinder of the brake system, and also taking into account an accumulator pressure determined in the accumulator.

8 Claims, 4 Drawing Sheets

METHOD AND DEVICE FOR ESTIMATING AN ADMISSION PRESSURE IN A MOTOR VEHICLE BRAKE SYSTEM

FIELD OF THE INVENTION

The present invention relates to a method and a device for estimating an admission pressure in a motor vehicle brake system.

BACKGROUND INFORMATION

A method for determining a pressure quantity, in particular in a brake system having a delivery pump is described in German Published Patent Application No. 195 28 697. The differential pressure between a first line and a second line is determined on the basis of a quantity that represents a measure of the delivery pump speed.

In addition, German Published Patent Application No. 197 29 097 describes a method for controlling a brake system in which the brake pressure in at least one wheel brake is electrically controlled at least on the basis of the driver's braking request, with a high-pressure accumulator being provided whose pressure is detected, and with this accumulator pressure being used to control the brake system, whereby, if the accumulator pressure detection system fails, the accumulator pressure is estimated on the basis of a model, and the estimated value is used to control the brake system.

Particularly to ensure the optimum use of a stop control or anti-spin control system (SCS/ASC system), it is advantageous to control intake and discharge valves assigned to a wheel brake cylinder, taking into account the admission pressure, i.e., the pressure between the main brake cylinder and the intake valve. It is possible to detect this pressure with a sensor, although the sensors that can be used for this purpose are very expensive. German Published Patent Application No. 195 28 697 cited above describes a method for estimating the admission pressure on the basis of an accumulator pressure prevailing in an accumulator located at the output end of the wheel brake cylinder. It is assumed in this case that this accumulator pressure is less than the admission pressure, making it possible to use a measured pressure difference to estimate the admission pressure. Disregarding the pressure chamber pressure, however, limits the accuracy of the admission pressure determination to a certain degree.

SUMMARY OF THE INVENTION

An object of the present invention is to provide a method and a device, respectively, that can be used to easily determine a or the prevailing admission pressure, i.e., a pressure prevailing between the main brake cylinder and an intake valve of a wheel brake cylinder of a motor vehicle brake system.

Taking into account an admission pressure determined, i.e., estimated, according to the present invention makes it possible to significantly improve an SCS or ASC system. There is no need to provide admission pressure sensors with which numerous conventional SCS/ASC systems are equipped. Further advantages are obtained in connection with a sputter braking action. A sputter braking action occurs when the driver greatly varies the admission pressure by operating the brake pedal. Estimating the admission pressure according to the present invention makes it possible to easily detect this pressure and modify the SCS system accordingly.

In LMV-type systems, great advantages for controlling the valves can be achieved by taking into account an admission pressure, and thus also taking into account admission pressure fluctuations.

According to one especially preferred embodiment of the method according to the present invention, the accumulator pressure is determined on the basis of a time that is needed to reduce the pressure in a wheel brake cylinder and to subsequently empty the accumulator. A sufficiently accurate determination, i.e., model, of an accumulator pressure can be obtained on the basis of these easily determinable input quantities. It is also possible to measure the accumulator pressure using suitable sensors.

One particularly preferable approach is for the run-on voltage to be measured as well as modeled on the basis of the determined accumulator pressure and a presettable admission pressure serving as the working point, with the difference between the measured and modeled run-on voltage being viewed as a measure of a difference between the actual admission pressure and the admission pressure serving as the working point.

A working pressure that is determined, i.e., estimated, during one preceding estimate, in particular the immediately preceding estimate, is suitably selected as the admission pressure serving as the working pressure. Highly accurate admission pressure estimates can be obtained by recursively selecting the admission pressure to be used for the model in this manner.

A pressure between 70 and 120 bar, in particular pressures of 80 or 100 bar, is or are preferably selected as the working pressure. These values typically represent occurring admission pressure values, making it possible to determine relatively accurately the difference between the measured and modeled run-on voltage on the basis of a linear relation between the run-on voltage and admission pressure.

DETAILED DESCRIPTION

A method is described whereby electrically operated intake and discharge valves are used to modulate the pressure in the individual wheel brakes of a vehicle that is equipped with a stop control and/or anti-spin control system (SCS/ASC system). Two-way valves are preferably used for this purpose. The desired pressure increase gradient or the pressure decrease gradient is achieved by controlling the valves with pulse sequences and varying the pulse-to-pause ratio.

The intake valve, which is inserted between the brake pressure sensor or main brake cylinder and the wheel brake or wheel brake cylinder in the brake line, is generally set to allow a flow in the idle position, while the discharge valve, which is used to reduce the pressure, blocks the path of the pneumatic medium to the main brake cylinder in the idle position using a recirculating pump.

Figure 1:
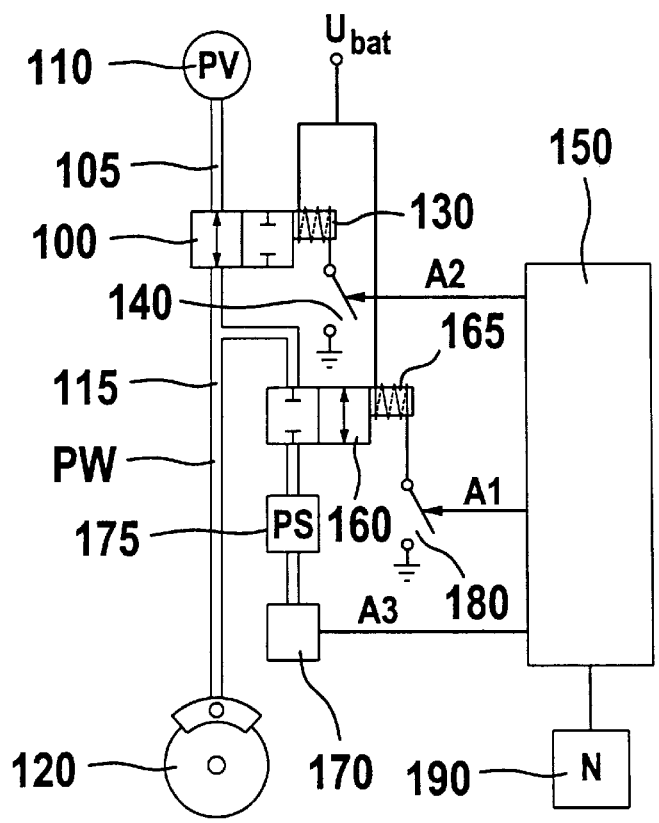
FIG. 1 shows a schematic representation of main elements of the device according to the present invention.

FIG. 1 shows the situation based on the example of an intake valve and a discharge valve of a stop control and/or anti-spin control system. The procedure described is not limited solely to an application with intake and discharge valves in brake systems with stop control and/or anti-spin control systems, but can also be used in other applications with similar arrangements.

An intake valve 100 is connected to a main brake cylinder 110 by a first port via a first line 105. A pressure PV, which is also referred to as the admission pressure, normally prevails in the first line. The second port of intake valve 100 is connected to wheel brake 120, i.e., a wheel brake cylinder (not illustrated specifically), via a second line 115. Pressure PW, which determines the wheel braking force, prevails in second line 115.

Second line 115 is connected to a port of a discharge valve 160, whose second port is connected to an accumulator 175. A pressure prevailing in the accumulator is identified by PS. Accumulator 175 is connected to main brake cylinder 110 via a recirculating pump 170. In the interest of simplicity, a corresponding connecting line between recirculating pump 170 and main brake cylinder 110 is not shown specifically in the representation. Intake valve 100, which is designed as a two-way solenoid valve, releases the flow between first line 105 and second line 115 in its idle position, i.e., when no current is flowing through a coil 130. In this position, the solenoid valve armature is held in place by a spring. The energizing of coil 130 exerts a force against the spring force, placing the valve in its closed position.

Discharge valve 160, which has a similar design and provides a blocking action in its idle position, can similarly be energized using a coil 165.

Coil 165 is connected to a first electrical port having a supply voltage Ubat and a second port having a switching device 180. Coil 130 is thus connected to supply voltage Ubat via a first electrical port and a second switching device 140 via a second port. Field-effect transistors are preferably used as a switching device.

The control port of the first switching device 180 is connected to a control unit 150. A first control signal A1 is applied to the first switching device 180 via this connection. The control port of the second switching device 140 is also connected to control unit 150 and receives a second control signal A2 from this unit.

The closing of switching devices 140 and 180 releases the flow of current from the supply voltage, through coils 130 and 165, respectively, to the ground connection.

Control unit 150 is preferably a stop control and/or anti-spin control system. The latter processes a variety of signals from different sensors, or signals from other control units, such as a cruise control system, a vehicle dynamics controller, and/or a driving speed limiter, for example. In particular, this apparatus processes signals from speed sensors 190, which detect the speeds of the various motor vehicle wheels. Based on the various processed signals, control unit 150 determines signals A1 and A2 for controlling coils 130 and 165.

Valves 100 and 160 can be used to control the rise and fall of pressure in second line 115, and thus also in the wheel brake cylinder.

Control unit 150 can also apply a control signal A3 to recirculating pump 170.

The illustrated device operates as follows: during normal operation, the solenoid valves are in the positions shown in the drawing. When the driver operates the brake pedal (not illustrated), the pressure rises in line 105, which produces a corresponding pressure rise in second line 115. If one wheel shows a tendency to slip or lock, control unit 150 springs into action. The main states that occur during brake control are known per se and will therefore not be explained in any further detail here.

To achieve optimum control of the discharge valve and, in particular, the intake valve, pressures PV (admission pressure) in first line 105 and PS (accumulator pressure) in accumulator 175 should be determined with as much accuracy as possible.

Recirculating pump 170 is clock-controlled in the usual manner. For this purpose, recirculating pump 170 can be energized by a switching device that is not illustrated specifically.

Figure 2:
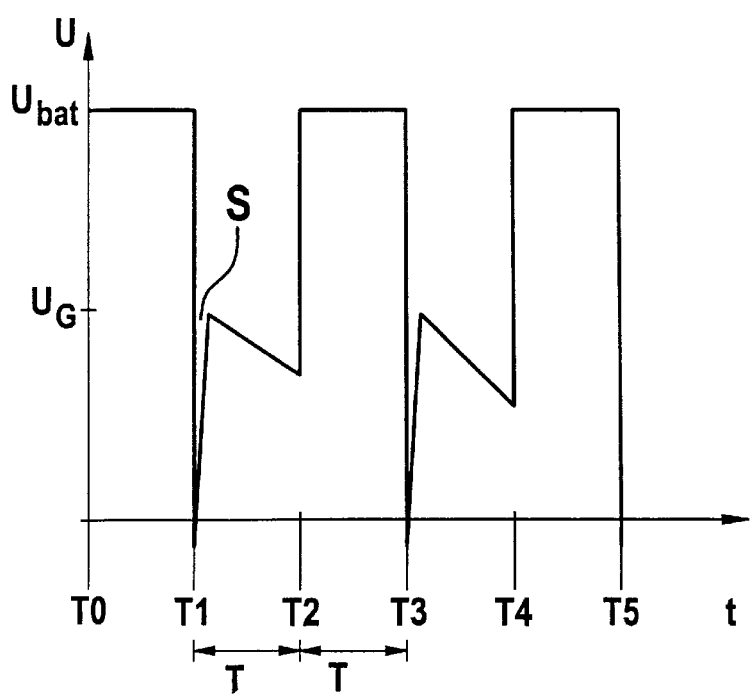
FIG. 2 shows a schematic representation of the voltage present at a recirculating pump and plotted over time.

In FIG. 2, the voltage present at recirculating pump 170 is plotted schematically over time t. The switching device is closed at time T0. The voltage decreasing at recirculating pump 170 roughly corresponds here to supply voltage Ubat. At time T1, the switching device opens, and the voltage briefly drops to values less than 0 (range identified by S). The interpulse period of the pulse sequence begins at time T1. The pump, which continues to run during interpulse period Taus between time points T1 and T2, now acts as a generator. As a result, a voltage, referred to as the run-on voltage, is generated at the recirculating pump and decreases slowly over time, based on value UG.

At time T2, switch closes again and the voltage increases to supply voltage Ubat. At time T3 following the expiration of time T1, the voltage drops back to values less than 0 and then starts rising again to value UG. At time T4, the switching device is closed again and remains closed until time T5.

According to the present invention, it was recognized that admission pressure PV can be easily estimated on the basis of the pump run-on voltage, its gradient, and accumulator pressure PS. To do this, the variation of the run-on pressure present at recirculating pump 170 is measured, for which purpose pump 170 is operated in clocked mode, as described above. The run-on voltage of pump 170 is largely a function of the admission pressure and the accumulator pressure. Pump braking in generator mode (between times T1 and T2, and between T3 and T4, respectively, in FIG. 2), i.e., the gradient of the voltage drop, largely depends on these input quantities. According to the present invention, the admission pressure is derived retroactively from the measured pump motor run-on voltage and a modeled or measured accumulator pressure.

The accumulator pressure is modeled, for example, on the basis of a time that is needed to reduce the pressure in a wheel cylinder 120, to deliver pneumatic medium to accumulator 175, and to subsequently empty the latter via recirculating pump 170. This time can be determined, for example, by taking into account the control time for discharge valve 160.

Furthermore, the pump motor run-on voltage is modeled as a function of the modeled or measured accumulator pressure in the case of a certain admission pressure serving as a working point, for example 80 or 100 bar, and with a clocked motor. The variation in the modeled run-on voltage is adjusted so that the modeled and measured motor voltages largely match, i.e., correspond, in run-on mode. A difference between the measured and modeled run-on voltages of the pump motor is a measure of the difference between the actual admission pressure and the selected working point. This makes it possible to easily determine an actual admission pressure.

Figure 3:
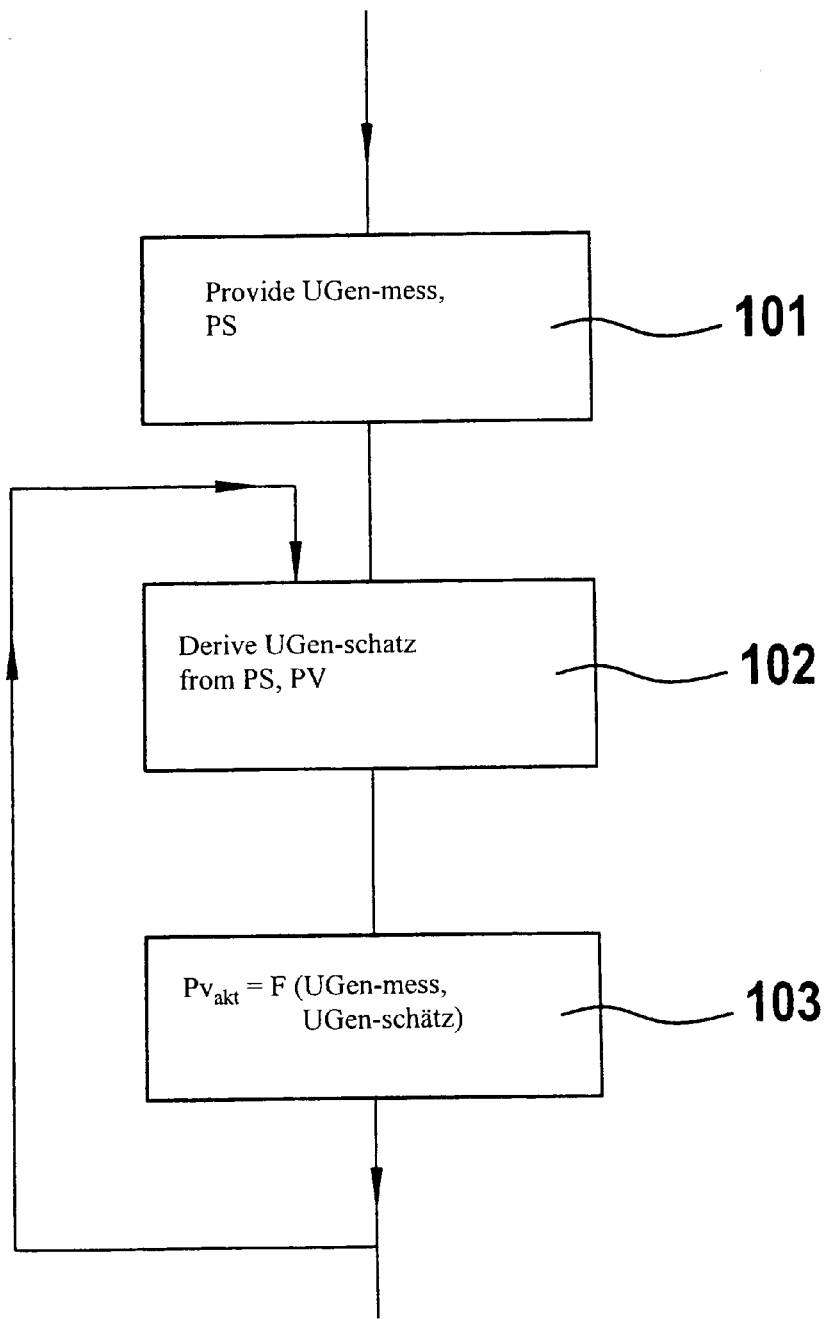
FIG. 3 shows a flowchart illustrating the method according to the present invention.

One preferred embodiment of the method according to the present invention is further explained on the basis of FIG. 3.

A measured motor or generator voltage of recirculating pump 170 ($U_{Gen-mess}$) and accumulator pressure PS are provided in a step 101. As illustrated in the example above, accumulator pressure PS can be provided by modeling, in particular by taking into account the control time for discharge valve 160 or the corresponding pressure decrease time, or, for example, it can also be measured directly using a sensor (not illustrated).

In a subsequent step 102, an estimated run-on voltage $U_{Gen-schätz}$ is determined on the basis of accumulator pressure PS as well as a presettable admission pressure PV serving as the working point. Admission pressure PV can be a preset, fixed value that does not change over the course of the measurement, for example a value of 80 or 100 bar. It is also possible to provide pressure PV recursively, as explained below.

In a subsequent step 103, instantaneous admission pressure value PV-akt is estimated as a function of measured run-on voltage $U_{Gen-mess}$ and estimated, i.e., modeled, run-on voltage $U_{Gen-schätz}$. Instantaneous admission pressure PV-akt can be derived, for example, from the voltage differences between the two run-on voltages by applying known mathematical relations. For example, the difference between the voltage values and/or the difference between the various voltage curve gradients can be used for this purpose. In particular, the transition from the steep edge of the run-on voltage curve to the flatter shape can be taken into account, as identified by S in FIG. 2, in which case it can be suitable to disregard or smooth the drop in voltage below zero, which initially occurs for a short time. Steps 101 through 103 can be repeated as often as necessary, which provides a continuous estimate of admission pressure PV. For example, admission pressure PV used in step 102 can be continuously adjusted on the basis of value PV-akt determined in a preceding estimate. However, it is also possible to always use the same value.

In reference to FIGS. 4 and 5, the estimate, i.e., modeling, of the run-on voltage of recirculating pump 170 that can be carried out with the method according to the present invention is explained in greater detail below.

Figure 4:
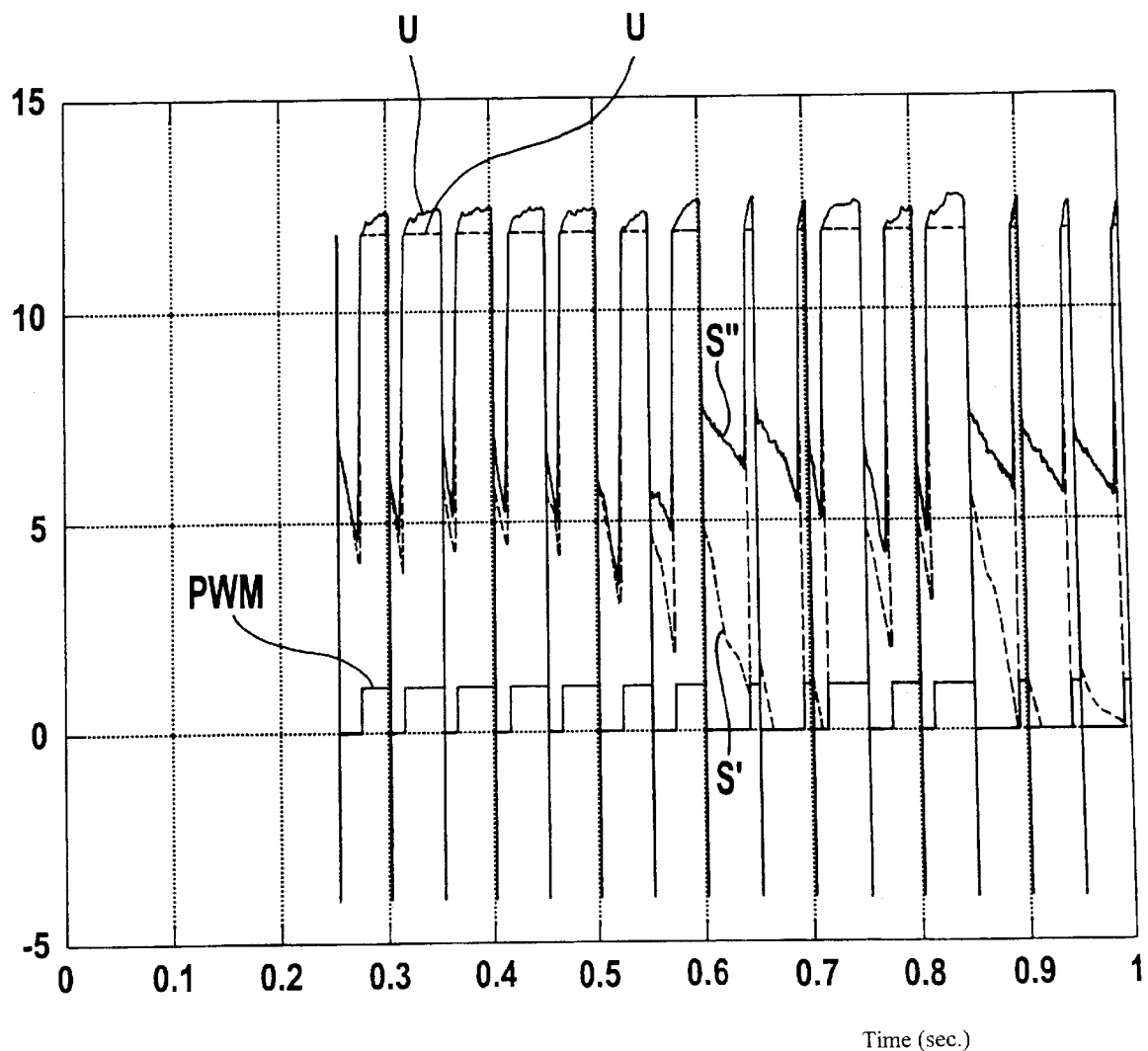
FIG. 4 shows an estimated and measured run-on voltage of a pump motor plotted over time, in which the run-on voltage estimate in this case does not take into account an accumulator pressure.

FIG. 4 first shows a PWM signal that is used to control recirculating pump 170 (with any voltage units). In addition, measured run-on voltage $U_{Gen-mess}$ as well as run-on voltage $U_{Gen-schätz}$ that is simulated, i.e., modeled, without taking into account the accumulator pressure are plotted five voltage units higher. Particularly in the case of long deactivation times (zero level of the PWM signal), such as those present between T=0.6 and one second, it is clear that falling voltage edges S' modeled during such deactivation times are very poor choices for modeling or reproducing measured falling voltage edges S". It is not possible to determine a functional relation, in particular, a linear functional relation between the two voltage curves, on the basis of which admission pressure PV underlying the measured voltage could be determined.

Figure 5:
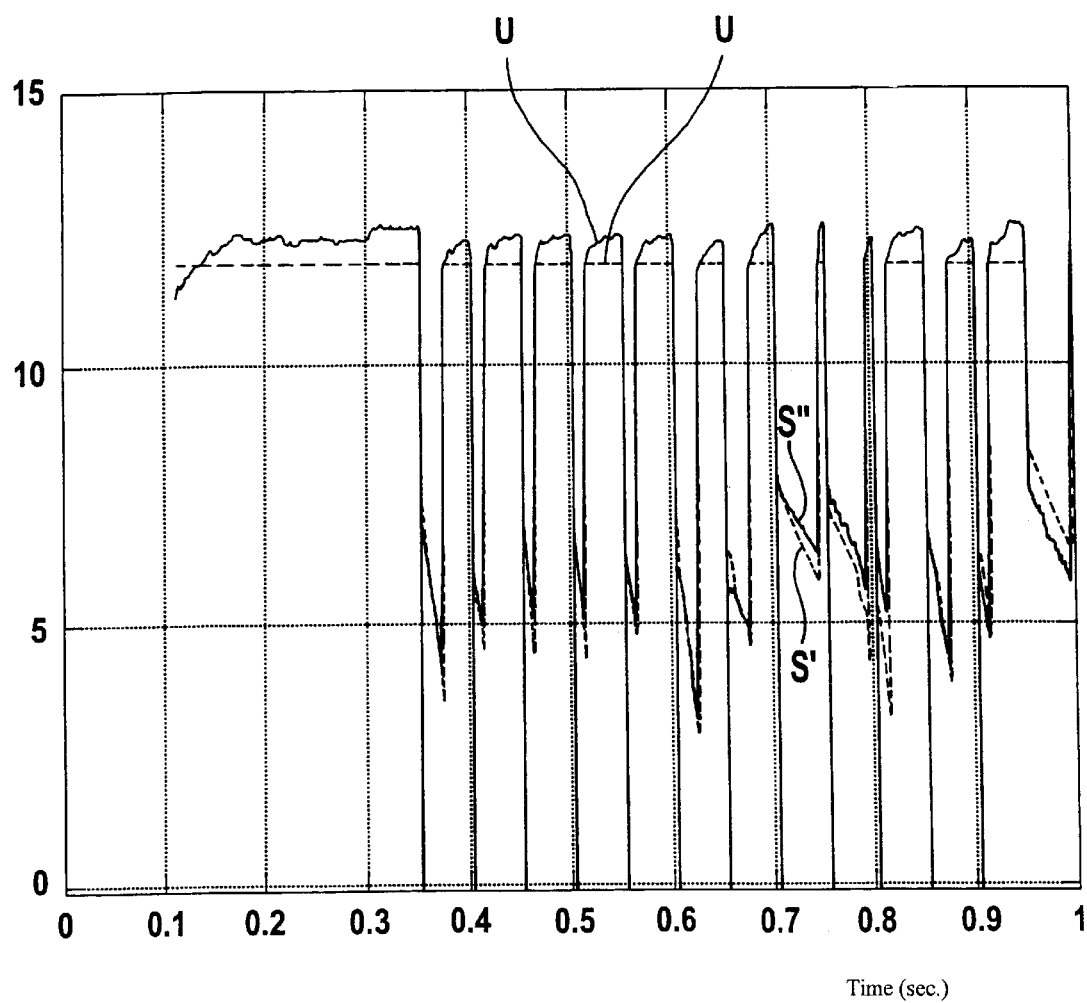
FIG. 5 shows a representation according to FIG. 4, in which the run-on voltage is estimated, taking into account the accumulator pressure.

According to the representation in FIG. 5, in which the run-on voltage model takes into account the accumulator pressure, it is apparent that a much more accurate adjustment of the modeled voltage variations to the actual voltage variations can be achieved even for the longer pump deactivation times. It is also apparent that a relatively good linear relation exists between the two voltage curves for the respective run-on voltage segments. This means that the admission pressure values underlying voltage edges S" can be derived from voltage edges S' modeled on the basis of a known admission pressure value.

What is claimed is:

1. A method for estimating an admission pressure prevailing between a main brake cylinder and an intake valve of a wheel brake cylinder of a motor vehicle brake system, comprising the steps of:

performing one of a modeling and a measurement of an accumulator pressure in an accumulator;

measuring a run-on voltage of a clocked-mode motor of a pump for recirculating a brake fluid from the accumulator, located at an output end of the wheel brake cylinder, to the main brake cylinder, and estimating the admission pressure as a function of the measured run-on voltage and the accumulator pressure.

2. The method according to claim 1, wherein the modeling of the accumulator pressure is performed as a function of a time for reducing a pressure in the wheel brake cylinder and for subsequently emptying the accumulator.

3. The method according to claim 1, further comprising the step of:

modeling the run-on voltage as a function of the accumulator pressure and a presettable admission pressure, wherein:

a difference between the measured and modeled run-on voltages corresponds to a measure of a difference between an actual admission pressure and the presettable admission pressure.

4. The method according to claim 3, wherein the presettable admission pressure corresponds to a preceding estimate of the admission pressure.

5. The method according to claim 4, wherein the preceding estimate of the admission pressure corresponds to an immediately preceding estimate of the admission pressure.

6. The method according to claim 1, further comprising the step of:

selecting a presettable admission between a pressure range of 70 and 120 bar.

7. The method according to claim 1, further comprising the step of:

selecting a presettable admission pressure between a pressure range of 80 and 100 bar.

8. A device for estimating an admission pressure prevailing between a main brake cylinder and an intake valve of a wheel brake cylinder of a motor vehicle brake system, comprising:

an arrangement for estimating the admission pressure as a function of a run-on voltage of a clocked-mode motor of a pump for recirculating a brake fluid from an accumulator, located at an output end of the wheel brake cylinder, to the main brake cylinder of the motor vehicle brake system and an accumulator pressure.

* * * * *